(12) United States Patent
Nagayoshi et al.

(10) Patent No.: US 8,931,913 B2
(45) Date of Patent: Jan. 13, 2015

(54) TRUNK OF MOTORCYCLE

(71) Applicant: Suzuki Motor Corporation, Shizuoka-Ken (JP)

(72) Inventors: Michio Nagayoshi, Shizuoka-Ken (JP); Makoto Iida, Shizuoka-Ken (JP)

(73) Assignee: Suzuki Motor Corporation, Hamamatsu-shi, Shizuoka-ken (JP)

( * ) Notice: Subject to any disclaimer, the term of this patent is extended or adjusted under 35 U.S.C. 154(b) by 78 days.

(21) Appl. No.: 13/793,614

(22) Filed: Mar. 11, 2013

(65) Prior Publication Data
US 2013/0240584 A1 Sep. 19, 2013

(30) Foreign Application Priority Data

Mar. 14, 2012 (JP) ................ 2012-057456

(51) Int. Cl.
*B62J 9/00* (2006.01)
*B62J 6/04* (2006.01)
*B62J 6/18* (2006.01)
*B60Q 1/26* (2006.01)

(52) U.S. Cl.
CPC .... *B62J 9/00* (2013.01); *B62J 6/04* (2013.01); *B62J 6/18* (2013.01); *B62J 9/001* (2013.01); *B60Q 1/2661* (2013.01)
USPC ........................................................ 362/154

(58) Field of Classification Search
CPC ................. B62J 9/00; B62J 6/04; B62J 6/18; B62J 9/001; B60Q 1/2661; B60Q 1/30
See application file for complete search history.

(56) References Cited

FOREIGN PATENT DOCUMENTS

| DE | 29617634 | * | 2/1997 |
|----|----------|---|--------|
| DE | 296 17 634 U1 | | 3/1997 |
| EP | 0 882 644 A2 | | 9/1998 |
| EP | 0882644 | * | 12/1998 |
| EP | 1 078 848 A1 | | 2/2001 |
| EP | 1078848 | * | 2/2001 |
| GB | 2477992 A | | 8/2011 |
| JP | 1-101994 U | | 7/1989 |
| JP | 04-050089 A | | 2/1992 |
| JP | 6263072 A | | 9/1994 |

OTHER PUBLICATIONS

European Search Report, European Application No. 13158979.8 dated Jun. 14, 2013.

* cited by examiner

*Primary Examiner* — Bao Q Truong
(74) *Attorney, Agent, or Firm* — Barnes & Thornburg LLP

(57) ABSTRACT

A motorcycle is provided a trunk having a storage compartment. The trunk includes a trunk body member having an upper opening, and including an outer body member and an inner body member provided inside the outer body member, and a lid member attached to the trunk body member so as to cover the opening of the trunk body member and provided with a lamp device for illuminating a rear side of the trunk, the lid member including an outer lid member and an inner lid member provided inside the outer lid member. A wire cord of the lamp device is passed through a gap between the outer lid member and the inner lid member and a gap between the outer body member and the inner body member.

4 Claims, 5 Drawing Sheets

TRUNK OF MOTORCYCLE

PRIORITY CLAIM

This patent application claims priority to Japanese Patent Application No. 2012-057456, filed 14, Mar. 2012 the disclosure of which is incorporated herein by reference in its entirety.

BACKGROUND OF THE INVENTION

1. Field of the Invention

The present invention relates to a trunk of a motorcycle disposed at and attached to a rear portion of a seat of the motorcycle, and more particularly, to a trunk of a motorcycle having a lamp device arranged on a lid member for the trunk of the motorcycle.

2. Related Art

Conventionally, there is known a motorcycle provided with a trunk having a compartment to be opened or closed by vertically rotating or pivoting a lid member attached thereto. Such known trunk has a lamp device such as a stop lamp provided on the lid member (for example, see Patent Document 1 (Japanese Patent Laid-Open Publication No. 6-263072)).

With such a trunk of a motorcycle, the lid member is attached to a trunk body member to be rotatable by a hinge portion, and the lid member is formed with a through hole facing the lens of the stop lamp. A lamp body of the stop lamp is arranged on the inside of the through hole via a packing for seal (sealing packing).

A wire cord of the stop lamp is provided along the inner surface of the lid member, and is extended toward the trunk body member across the hinge portion so as to be connected to a permanent stop lamp of a motorcycle main body. According to such a structure, the stop lamp is turned on at the time of braking the motorcycle together with the permanent stop lamp to effectively notify a following vehicle of the state of braking to thereby alert the vehicle.

However, with the trunk of the motorcycle described in Patent Document 1, the stop lamp body and the wire cord are provided in the storage compartment in an exposed manner. Accordingly, there is a fear such that a stored article may collide with the stop lamp body and the wire cord, and the wire cord and the stop lamp may be damaged or may break. In addition, when high pressure water is applied to the sealing packing provided to the through hole at the time of car wash, such an inconvenience will be conceived that the water which has passed through a seal portion enters the storage compartment and soaks the stored article.

SUMMARY OF THE INVENTION

The present invention is made in consideration of the circumstance described above, and an object thereof is to provide a trunk of a motorcycle capable of preventing breakage of a wire cord or breakdown of a lamp device and preventing water from entering a storage compartment.

The above and other objects can be achieved according to the present invention by providing a trunk of a motorcycle provided with a storage compartment, including: a trunk body member having an upper opening, and including an outer body member and an inner body member provided inside the outer body member; a lid member attached to the trunk body member so as to cover the opening of the trunk body member and provided with a lamp device for illuminating a rear side of the trunk, the lid member including an outer lid member and an inner lid member provided inside the outer lid member; and a wire cord of the lamp device passing through a gap between the outer lid member and the inner lid member and a gap between the outer body member and the inner body member.

According to the above structure, since the lamp device and the wire cord of the lamp device are arranged outside the inner lid member and the inner body member, an article stored inside the storage compartment does not collide with the lamp device or the wire cord. Accordingly, breakage of the wire cord or breakdown of the lamp device can be prevented. Furthermore, since water which has entered inside the outer lid member through the gap at the attachment portion of the lamp device flows down on the outside of the inner lid member, the water can be prevented from entering the storage compartment.

In a preferred example of the above structure, it may be desired that the lid member is rotatably connected to the trunk body member through a hinge portion, the wire cord is accommodated in a housing provided in a vicinity of the hinge portion, the wire cord has a slack portion for allowing rotation of the lid member in a vicinity of the hinge portion, and the slack portion is accommodated in the housing.

According to this structure, in addition to the above advantageous effects, an extra length of the wire cord for allowing rotation of the lid member may be secured as the slack. Thus, when the lid member rotates upward, the slack of the wire cord is drawn out from the housing and the rotation of the lid member is not interrupted. Furthermore, when the lid member is rotated downward, the wire cord is accommodated in the housing as the slack, and the wire cord is not caught between the lid member and the trunk body member and twisting of the wire cord inside the housing can be prevented.

It may be further desired that a guide portion for slackening the wire cord in a rotating axis direction of the hinge portion is formed in a vicinity of the hinge portion.

According to this structure, the wire cord can be slackened in the gap along the rotating shaft direction of the hinge portion, and the capacity of the housing can be reduced and the capacity of the storage compartment can be increased.

It may be further desired that an attachment surface for the lamp device is formed to the outer lid member, a communication hole communicating the gap between the outer lid member and the inner lid member to an outside of the trunk is formed in the attachment surface, and the lamp device is attached so as to block the communication hole.

According to this structure, water entering from the communicating hole can be reduced by the lamp device.

It may be further desired that the inner lid member has an edge overlapped with an edge portion of the inner body member from an outside in a closed state of the lid member.

According to this structure, since water which has entered through the gap at the attachment portion of the lamp device flows down from the edge portion of the inner lid member without following the edge portion of the inner body member, water can be prevented from entering the storage compartment.

In addition, according to the present invention, the breakage of a wire cord and the breakdown of a lamp device can be prevented, and entering of water into a storage compartment can be prevented.

The nature and further characteristic features of the present invention will be made clearer from the following description made with reference to the accompanying drawings.

BRIEF DESCRIPTION OF THE DRAWINGS

In the accompanying drawings:

FIG. 2 includes FIGS. 2A and 2B according to the embodiment of FIG. 1, in which

FIG. 3 includes FIGS. 3A and 3B according to the embodiment of FIG. 1, in which

FIG. 4 includes FIGS. 4A and 4B according to the embodiment, in which FIG. 5 includes FIGS. 5A to 5C, as schematic sectional views, according to the embodiment, in which

DESCRIPTION OF THE PREFERRED EMBODIMENT

Hereinafter, an embodiment will be described in detail with reference to the accompanying drawings.

It is to be noted that although in the following description, a trunk of a motorcycle according to the present invention is applied to a touring motorcycle is described, the trunk of the motorcycle according to the present embodiment may be applied to other types of motorcycles.

It is also to be noted that terms "upper", "lower", "right", "left" and the like indicating direction are used herein with reference to the illustration of the drawings or in a standing state of the motorcycle and also noted that the forward part and the rearward part of a vehicle body are indicated by arrows FR and RE, respectively, and the left side and the right side of the vehicle body are indicated by L and R, respectively.

Figure 1:
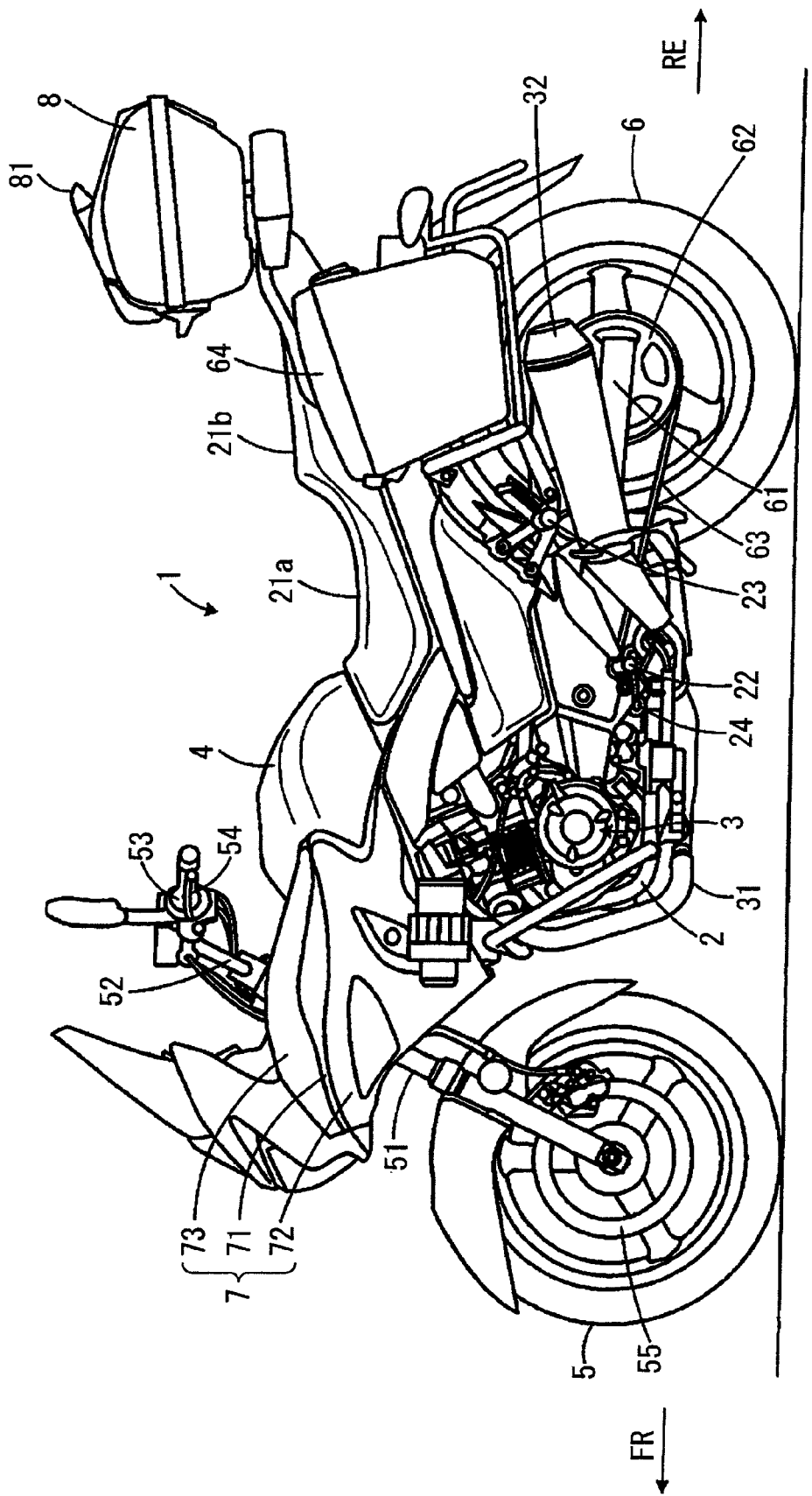
FIG. 1 is a left side view of a motorcycle according to an embodiment of the present invention.

As shown in FIG. 1, the motorcycle 1 is configured by being provided with various covers or covering members, as the exterior of the vehicle body, to a double cradle type vehicle body frame 2 made of steel or aluminum alloy on which units such as a power unit, electric compartments and the like are mounted. An engine 3 is mounted inside a double cradle portion at a substantially front half of the vehicle body frame 2. The engine 3 is supported, via an engine mount, to a frame member so as to surround the outer periphery thereof as viewed from the side. A fuel tank 4 is provided on the upper surface of the cradle portion of the vehicle body frame 2 at a position above the engine 3.

Various covers are attached or mounted in the periphery of the fuel tank 4 so as to cover the front end side of the vehicle body frame 2. A vehicle body cover 7 including an upper vehicle body cover 71, a lower vehicle body cover 72 and a vehicle body cover panel 73 is provided at the front side of the fuel tank 4. The head pipe and the main frame of the vehicle body frame 2 are covered by the vehicle body cover 7.

A rider's seat 21a and a pillion 21b are coupled together at the rear of the fuel tank 4. The rider's seat 21a and the pillion 21b are supported to a seat rail at a substantially rear half of the vehicle body frame 2. Footrests 22 and 23 are provided below the rider's seat 21a and the pillion 21b in a corresponding manner. A gear change pedal 24 is provided in front of the footrest 22 for a rider on the left side of the vehicle body, and a brake pedal, not shown, for a rear wheel 6 is provided in front of the footrest 22 for a rider on the right side of the vehicle body.

A front fork 51 is rotatably connected to the head pipe of the vehicle body frame 2. A handlebar 52 is provided to the front fork 51, and grips 53 are attached to both ends of the handlebar 52. A clutch lever 54 is arranged at the front left of the handlebar 52, and a brake lever, not shown, for a front wheel 5 is arranged at the front right of the handlebar 52. The front wheel 5 is turnably supported at the lower part of the front fork 51, and a disc brake 55 is provided to the front wheel 5.

A rear swingarm 61 is connected, swingably in the vertical direction, at a middle position in the longitudinal direction of the vehicle body frame 2, and a suspension, not shown, is attached between the vehicle body frame 2 and the rear swingarm 61. The rear wheel 6 is supported to be rotatable at the rear portion of the rear swingarm 61.

A driven sprocket 62 is provided on the left side of the rear wheel 6, and the power of the engine 3 is transferred to the rear wheel 6 by means of a drive chain 63. A disc brake, not shown, for the rear wheel 6 is provided on the right side of the rear wheel 6.

Furthermore, pannier cases 64 are provided on the left and right sides of the rear wheel 6, and a top case (i.e. trunk for a motorcycle) 8 is mounted behind the pillion 21b. A stop lamp (a lamp device) 81 that is turned on together with a permanent stop lamp, not shown, of the motorcycle 1 is attached at the top of the top case 8.

The engine 3 includes a parallel 4-cylinder engine and a transmission, for example, and is suspended from the vehicle body frame 2. Air is taken into the engine 3 via an intake duct, not shown, and the air is then mixed with the fuel by injecting the fuel from a fuel injector, now shown, and supplied to a combustion chamber. The exhaust gas after the combustion in the combustion chamber is exhausted from a muffler 32 via an exhaust pipe 31 extending downward from the engine 3.

An overall structure of the top case 8 of the motorcycle 1 will be described with reference to FIGS. 2A and 2B.

Figure 2A:
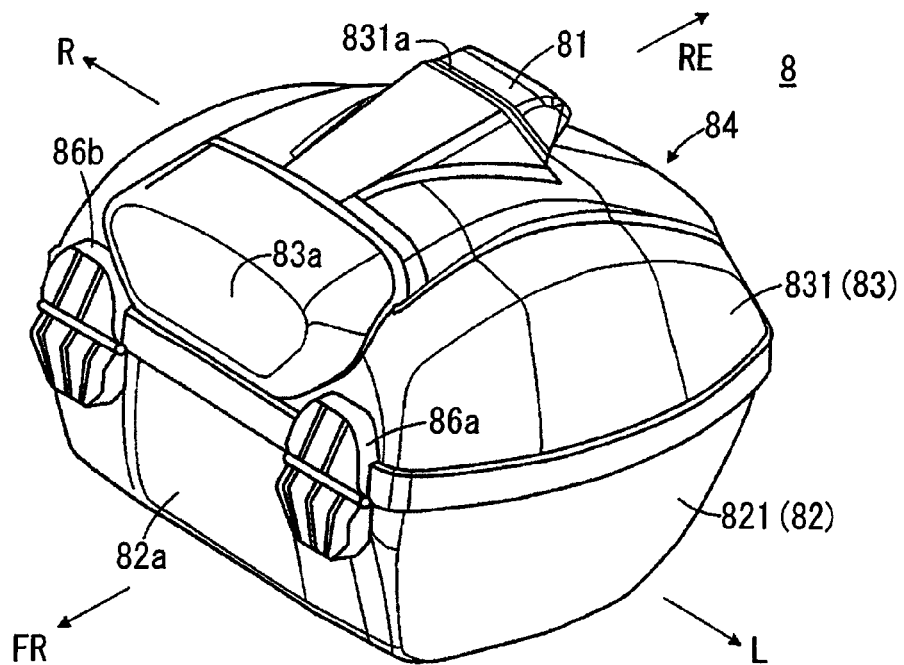
FIG. 2A is a perspective view of a top case of the motorcycle.
Figure 2B:
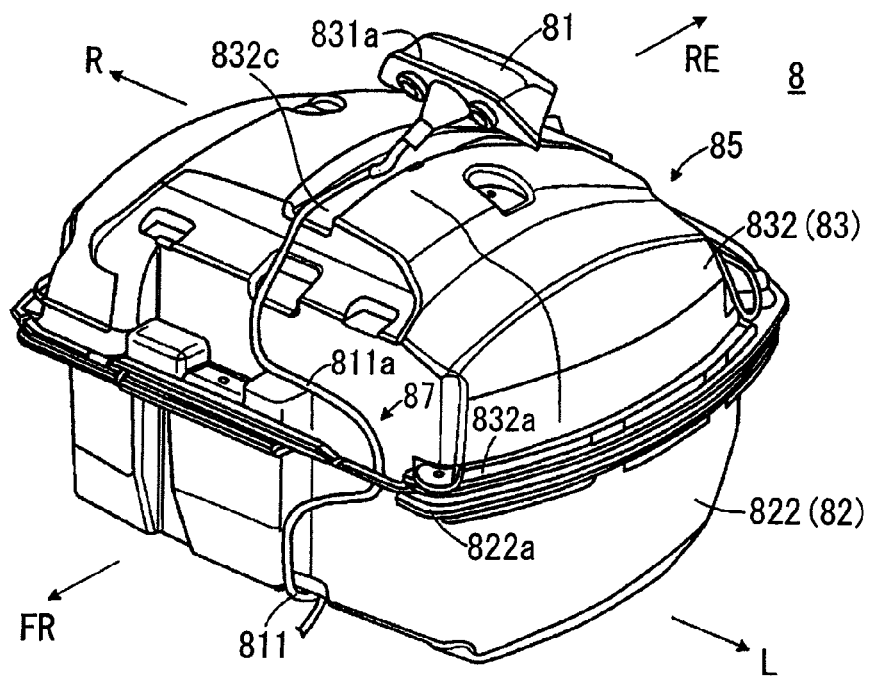
FIG. 2B is a perspective view of an inner box.

As shown in FIGS. 2A and 2B, the top case 8 according to the present embodiment has a substantially box shape and forms a storage compartment A (see FIGS. 3A and 3B) by having an upper cover (a lid member) 83 attached to a lower case (a trunk body member) 82 of a substantially box shape having an upper side opened outward. Further, the top case 8 has a double structure of an outer box 84 and an inner box 85 constituting the lower case 82 and the upper cover 83, respectively. The upper cover 83 is connected to the lower case 82 in a vertically rotatable manner by a pair of left and right hinge portions 86a and 86b joining a front surface 82a of the lower case 82 and a front surface 83a of the upper cover 83.

The upper cover 83 has an outer upper cover (an outer lid member) 831 of the outer box 84, and an inner upper cover (an inner lid member) 832 of the inner box 85 provided inside the outer upper cover 831. The inner upper cover 832 is provided so as to form a gap 83b (see FIG. 5A) inside the outer upper cover 831. In addition, a flange portion 832a protruding outward from an end portion at a lower position is provided to the inner upper cover 832.

The lower case 82 has an outer lower case (an outer body member) 821 of the outer box 84, and an inner lower case (an inner body member) 822 of the inner box 85 provided inside the outer lower case 821. The inner lower case 822 is arranged so as to form a gap 82b (see FIG. 5A) inside the outer lower case 821. In addition, a flange portion 822a protruding outward from an end portion at an upper position is provided to the inner lower case 822.

The stop lamp 81 for lighting the rear side of the top case 8 is arranged on the upper surface of the outer upper cover 831. The stop lamp 81 is attached to an attachment surface 831a provided on the upper surface of the outer upper cover 831. A communication hole, not shown, communicated with the gap 83b is provided at the center portion of the attachment surface 831a. The stop lamp 81 is attached to the attachment surface 831a in such a manner as to block the communication hole via a waterproof seal, not shown, and a wire cord 811 extends into the gap 83b through the communication hole. By blocking the communication hole with the stop lamp 81 in the manner mentioned above, amount of water entering from the communication hole can be reduced.

The wire cord 811 of the stop lamp 81 extends toward the outside from the lower portion through the gap 83b of the upper cover 83 and the gap 82b of the lower case 82. The wire cord 811 is connected to a wire cord of the permanent stop lamp of the motorcycle 1. The wire cord 811 is arranged with a slack 811a, as an extra length, for allowing opening/closing of the upper cover 83 within a path from the stop lamp 81 to the lower portion of the top case 8.

A groove 832c, having a predetermined width, extending in a direction of front-back (longitudinal direction) is provided at the center portion of the upper surface of the inner upper cover 832, thereby forming a path for the wire cord 811 between the inner upper cover 832 and the outer upper cover 831.

Further, the width of the groove 832c is made wider than the diameter of the wire cord 811 so as to allow the wire cord 811 to move in the width direction. By 811 is arranged in a manner sandwiched between the inner upper cover 832 and the outer upper cover 831. According to the structure mentioned above, the amount of the movement of the wire cord 811 at the time of opening/closing of the upper cover 83 is restricted to a predetermined range, thus stably opening and/or closing the upper cover 83.

The top case 8 includes a housing 87 (see FIG. 3B) for accommodating the slack 811a of the wire cord 811 near the hinge portion 86a on the left side of the vehicle body. The housing 87 is formed by cutting out a part of the flange portion 822a of the inner lower case 822 and a part of the flange portion 832a of the inner upper cover 832. In the present embodiment, a part of the flange portion 832a is cut out in a slit shape, and the movement of the wire cord 811 is thereby guided along a rotating shaft direction (a vehicle width direction) of the hinge portions 86a and 86b. By passing the wire cord 811 to the housing 87, the movement in the longitudinal direction of the vehicle body can be restricted, and the upper cover 83 can be stably opened and/or closed.

Next, an inner structure of the top case 8 will be described with reference to FIGS. 3A and 3B, in which the hinge portions 86a and 86b are omitted for the sake of convenience of description.

Figure 3A:
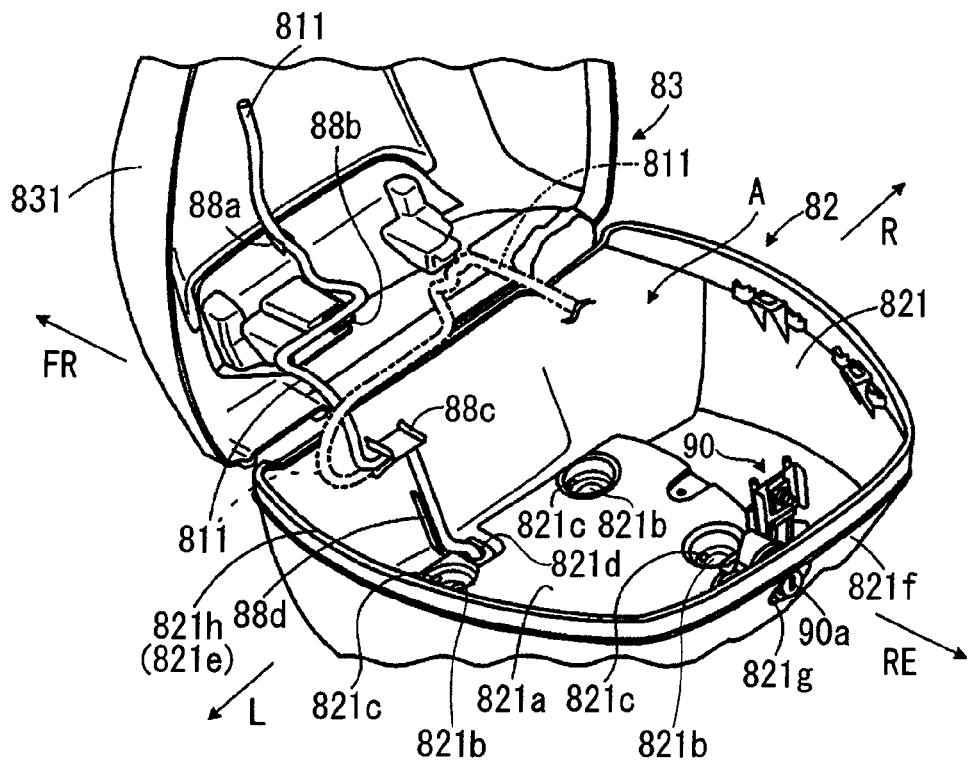
FIG. 3A is a perspective view showing an inner structure of an outer box and FIG. 3B is a perspective view showing an inner structure of the inner box.
Figure 3B:
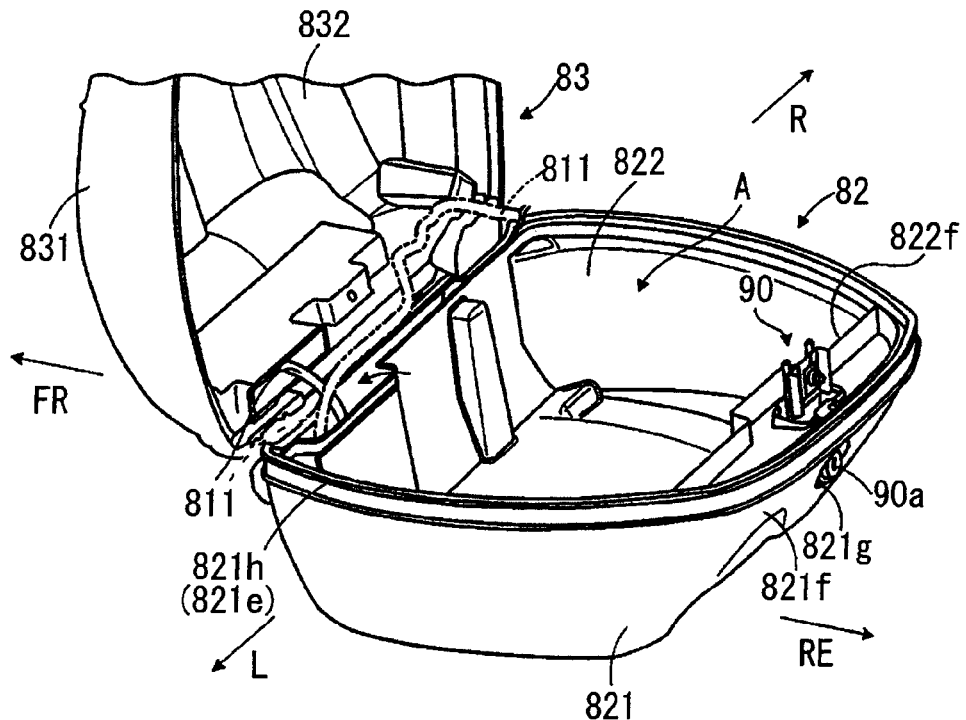

As shown in FIG. 3A, a seal rubber 821h for preventing water from entering the storage compartment A is provided at an edge portion 821e of the outer lower case 821. A plurality of mount holes 821b for fixing the top case 8 to the motorcycle 1 are formed in a bottom surface 821a of the outer lower case 821. Furthermore, a plurality of outlets (drain outlets) 821c for draining water staying inside the outer lower case 821 to the outside are formed in the bottom surface 821a of the outer lower case 821. The outlet 821c is provided near each mount hole 821b.

By providing and arranging the plurality of these outlets 821c, water which has entered from the gap 82b and flowed down to the bottom surface 821a can be drained even if a fixing member is passed through the mount hole 821b, and the top case 8 is fixed to the motorcycle 1. Moreover, a through hole 821d is formed in the bottom surface 821a of the outer lower case 821 so as to extend the wire cord 811 through this hole 821d to the lower portion of the top case 8.

A rib 88a for guiding the wire cord 811 from the stop lamp 81 downward is provided on the inner surface of the outer upper cover 831. In addition, ribs (guide portions) 88b and 88c for guiding the wire cord 811 to the housing 87 (see FIG. 3B) are also provided on the inner surfaces of the outer upper cover 831 and the outer lower case 821.

The ribs 88b and 88c guide the wire cord 811 along the rotating shafts of the hinge portions 86a and 86b, and the slack 811a of the wire cord 811 is thereby accommodated in the housing 87. By slacking the wire cord 811 along the vehicle width direction, the capacity of the housing 87 is reduced and the capacity of the storage compartment A is increased. Furthermore, a rib 88d for guiding the wire cord 811 which has gone through the housing 87 toward the through hole 821d is provided on the inner surface of the outer lower case 821.

The outer lower case 821 has a wall surface 821f, at the rear side of the vehicle body, which is sloped so as to separate upward from a wall surface 822f, at the rear side of the vehicle body, of the inner lower case 822.

A locking mechanism housing 89 (see FIG. 5A) for accommodating a locking mechanism 90 for the upper cover 83 is provided in a space having substantially a triangular shape as viewed from the side, between the wall surface 821f of the outer lower case 821 and the wall surface 822f of the inner lower case 822. The locking mechanism 90 engages with a fixed portion 832g (see FIG. 5A) of the inner upper cover 832, and fixes the upper cover 83 to the lower case 82 in a manner such that the upper cover 83 can be freely opened or closed.

Furthermore, a key cylinder insertion hole 821g (see FIG. 5C) into which a key cylinder 90a of the locking mechanism 90 is inserted is formed in the wall surface 821f of the outer lower case 821. The insertion hole 821g is provided so as to direct rearward of the vehicle body from the locking mechanism housing 89 and communicates the inside of the locking mechanism housing 89 and the outside.

According to the structure mentioned above, muddy rain water flows down along the wall surface 821f which slopes down toward the rear side of the vehicle body while travelling of the motorcycle 1. Accordingly, rain water can be prevented from entering through the key cylinder insertion hole 821g, and malfunction of the locking mechanism 90 can be prevented.

Hereunder, an opening/closing operation of the top case 8 will be described in detail with reference to FIGS. 4A and 4B.

Figure 4A:
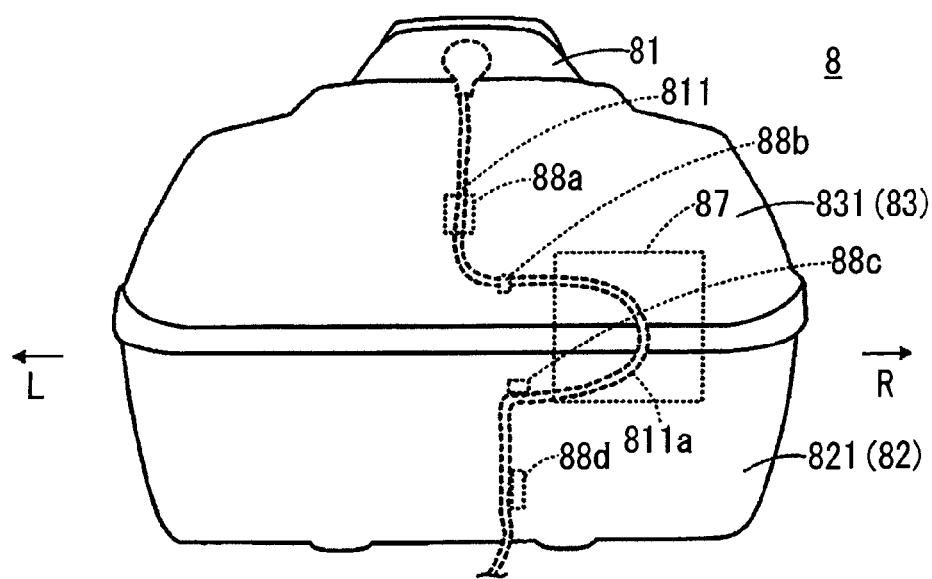
FIG. 4A is a back view schematically showing a state where a top case is closed.

As shown in FIG. 4A, the wire cord 811 drawn out from the stop lamp 81 is guided forward by the rib 88a, and the drawing direction is changed by the ribs 88b and 88c to the rotating axis direction (the vehicle width direction) of the hinge portions 86a and 86b. Due to such direction change in the route by the ribs 88b and 88c, the slack 811a of the wire cord 811 is accommodated in the horizontally long housing 87. The wire cord 811 which has passed through the housing 87 is guided downward toward the outside by the rib 88d. In a state where the top case 8 is closed, the wire cord 811 is accommodated in the housing 87 in a state of being greatly slackened in the vehicle width direction.

Figure 4B:
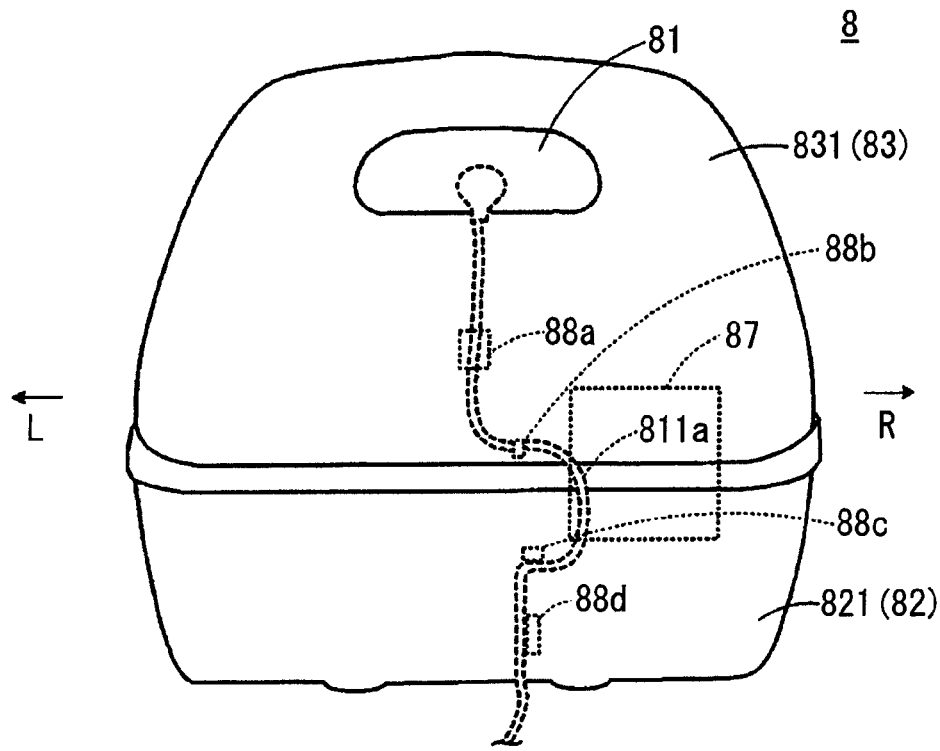
FIG. 4B is a back view schematically showing a state where a top case is open.

As shown in FIG. 4B, when the upper cover 83 is opened from the closed state of the top case 8, the stop lamp 81 of the upper cover 83 rotates upward around the hinge portions 86a and 86b. Accordingly, the path of the wire cord 811 extending from the stop lamp 81 toward the outside of the lower case 82 via the housing 87 becomes relatively longer than the case when the top case 8 is closed.

In the present embodiment, since the extra length of the wire cord 811 is accommodated in the housing 87 as the slack 811a, the length of the wire cord 811 necessary for the rotation of the lower case 82 is drawn out from the housing 87. As a result, the slackening of the slack 811a of the wire cord 811 becomes small, and the slack 811a moves toward the right side of the vehicle body along the rotating axis direction of the hinge portions 86a and 86b.

When the upper cover 83 is closed from a state where the top case 8 is opened, the stop lamp 81 of the upper cover 83 rotates downward around the hinge portions 86a and 86b. Accordingly, the path of the wire cord 811 extending from the stop lamp 81 toward the outside of the lower case 82 via the housing 87 becomes relatively shorter than the case when the top case 8 is open.

In the present embodiment, since the housing 87 for accommodating the slack of the wire cord 811 is provided, the increased amount of the wire cord 811 is accommodated inside the housing 87 according to the rotation of the lower case 82. As a result, as shown in FIG. 4A, the slackening of the slack 811a of the wire cord 811 becomes great, and the slack 811a moves to the left side of the vehicle body along the rotating axis direction of the hinge portions 86a and 86b.

As described above, in the present embodiment, an extra length of the wire cord 811 for allowing rotation of the upper cover 83 is accommodated in the housing 87 as the slack 811a. When the upper cover 83 is rotated upward from a state where the top case 8 is closed, the slackening portion of the wire cord 811 is drawn out from the housing 87 while being guided to the right side of the vehicle body, and the rotation of the upper cover 83 is not interrupted. Furthermore, when the upper cover 83 is rotated downward from a state where the top case 8 is open, the slack of the wire cord 811 is accommodated in the housing 87 by being guided to the left side of the vehicle body. Accordingly, the wire cord 811 is not caught between the upper cover 83 and the lower case 82, and the wire cord 811 inside the housing 87 can be prevented from twisting.

Next, a waterproof structure of the top case 8 according to the present embodiment will be described with reference to FIGS. 5A and 5C.

Figure 5A:
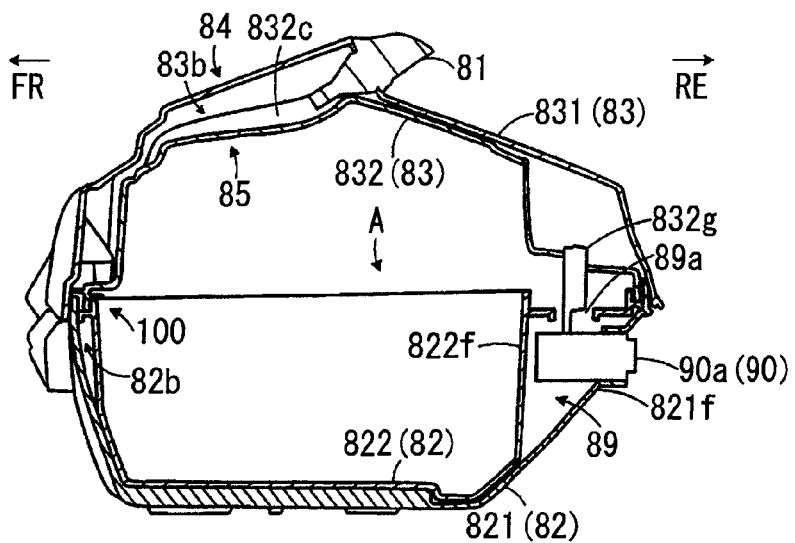
FIG. 5A is a cross-sectional view of the entire top case.

As shown in FIG. 5A, the top case 8, as a trunk according to the present embodiment, has a double structure of the outer box 84 and the inner box 85. Rain water or the like which has entered the outer box 84 from the attachment portion of the stop lamp 81 flows down through the gap 83b between the outer upper cover 831 and the inner upper cover 832 and then through the gap 82b between the outer lower case 821 and the inner lower case 822. Then, the rain water or the like which has flowed to the bottom surface of the outer lower case 821 is drained to the outside through the plurality of drain outlets 821c (see FIG. 3A) of the outer lower case 821.

Figure 5B:
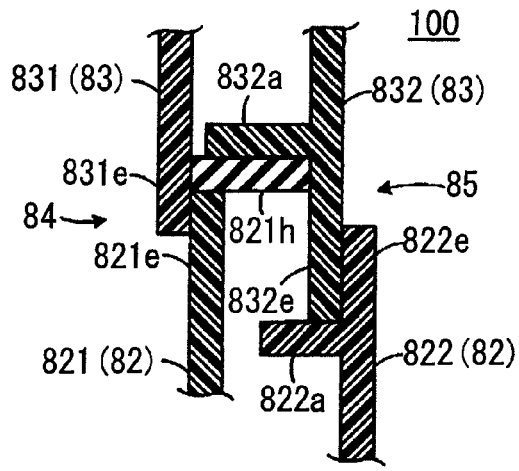
FIG. 5B is a partial enlarged view of FIG. 5A and shows a labyrinth structure.

As shown in FIG. 5B, a labyrinth structure 100 is provided as a waterproof structure at a portion at which the lower case 82 and the upper cover 83 of the top case 8 are joined. In the labyrinth structure 100, the flange portion 822a flaring outward from the inner lower case 822 is provided at a base end side of an edge portion 822e of the inner lower case 822. When the upper cover 83 is closed, an edge portion 832e of the inner upper cover 832 abuts against the base of the flange portion 822a. In this manner, the edge portion 832e of the inner upper cover 832 is overlapped with the edge portion 822e of the inner lower case 822 from the outside.

The flange portion 832a flaring outward from the inner upper cover 832 is provided at a base end side of the edge portion 832e of the inner upper cover 832. The edge portion 821e of the outer lower case 821 abuts against the tip of the flange portion 832a via the deal rubber 821h. Furthermore, an edge portion 831e of the outer upper cover 831 is overlapped with the edge portion 821e of the outer lower case 821 from the outside.

With such a labyrinth structure 100, the edge portion 831e of the outer upper cover 831 is overlapped with the edge portion 821e of the outer lower case 821 from the outside, and thus, the rain water flowing downward on the outer surface of the outer upper cover 831 can be prevented from entering. Moreover, the rain water or the like which has entered the gap between the edge portion 831e of the outer upper cover 831 and the edge portion 821e of the outer lower case 821 is prevented by the seal rubber 821h from entering the outer box 84.

Furthermore, because the edge portion 832e of the inner upper cover 832 is overlapped with the edge portion 822e of the inner lower case 822 from the outside, the rain water or the like which has entered the outer box 84 can be prevented from entering the inner box 85. The rain water or the like which has entered the outer box 84 flows downward and is then drained outside the top case 8 from the outlet 821c of the outer lower case 821. As a result, the rain water or the like can be prevented from entering the storage compartment A, and an article stored inside the storage compartment A can be protected from getting wet.

Figure 5C:
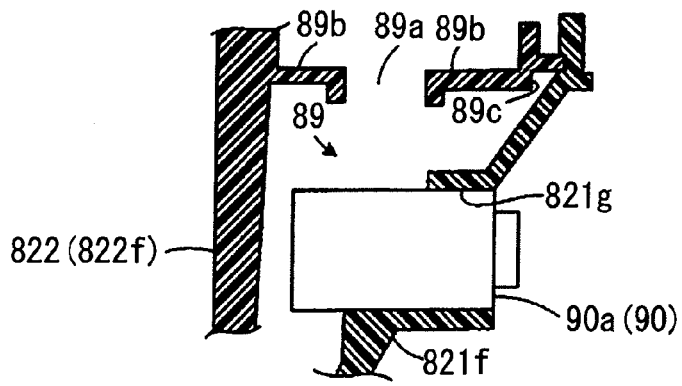
FIG. 5C is a partial enlarged view of FIG. 5A and shows a waterproof structure around a locking mechanism housing.

As shown in FIG. 5C, the locking mechanism 90 has the key cylinder 90a attached to the key cylinder insertion hole 821g on the wall surface 821f of the outer lower case 821. The fixed portion 832g that engages with the locking mechanism 90 at the time of closing the upper cover 83 is positioned above the locking mechanism 90 inside the locking mechanism housing 89. An opening 89a into which the fixed portion 832g enters toward the locking mechanism 90 is provided to the inner lower case 822 (see FIG. 5A). Furthermore, a flange-shaped cover 89b is provided above the locking mechanism 90, at a portion other than the opening 89a, so as to cover the portion above the locking mechanism 90. The key cylinder insertion hole 821g is arranged on the forward side of the vehicle body with respect to a rear end 89c of the cover 89b.

Since the cover 89b is provided so as to cover the upper side of the locking mechanism 90, the rain water or the like which has entered the locking mechanism housing 89 can be prevented from entering the storage compartment A. The rain water or the like which has entered the locking mechanism housing 89 flows downward and is then drained outside from the outlet 821c provided to the outer lower case 821. As a result, the rain water or the like can be prevented from entering the storage compartment A, and an article stored inside the storage compartment A can be saved from getting wet.

As described above, according to the top case 8 as the trunk of the embodiment described above, the stop lamp 81 and the wire cord 811 of the stop lamp 81 are provided outside the inner upper cover 832 and the inner lower case 822. An article stored inside the inner upper cover 832 and the inner lower case 822 can be prevented from colliding with the stop lamp 81 and the wire cord 811, and thus, breakdown of the stop lamp 81 or breakage of the wire cord 811 can be obviated.

Furthermore, since water which has entered from the gap at the attachment surface 831a of the stop lamp 81 flows down to the outside of the inner upper cover 832 and the inner lower case 822, the water can be prevented from entering the storage compartment A.

It is further to be noted that the present invention is not limited to the embodiment described above, and many other changes and modifications or alternations may be made without departing from the scopes of the appended claims, and particularly, the shapes and sizes shown in the accompanying drawings are not restrictive the illustrated ones and can be appropriately modified as long as the effects of the present invention is achieved.

For example, in the embodiment described above, although an example of the trunk of a motorcycle according to the present invention is applied to the top case 8 of a motorcycle, the present invention is not limited thereto, and the trunk of a motorcycle according to the present invention may also be applied to trunk other than the top case 8, such as the pannier case 64.

Furthermore, in the embodiment described above, although the stop lamp 81 is used as the lamp device, a blinker (winker) or the like may also be used as the lamp device as long as the outside of the motorcycle is illuminated.

Still furthermore, in the embodiment described above, although there is described a structure in which the upper cover 83 is rotatably connected to the lower case 82 via the hinge portions 86a and 86b, the present invention is not limited to such structure, and any other lid member may be used as long as the storage compartment A can be formed with the trunk body member, and for example, a sliding lid member may also be used.

Still furthermore, although there is described the structure in which the slack 811a is formed to the wire cord 811 by the ribs 88b and 88c as guide portions, the guide portions are not necessary if the slack 811a can be formed to the wire cord 811 without the guide portions.

As described hereinbefore, according to the preferred embodiments of the present invention, the breakage of a wire cord and the breakdown of a lamp device can be effectively prevented from causing and the water can be prevented from entering a storage compartment.

Moreover, the present invention is particularly effective as a trunk of a motorcycle of an on-road motorcycle.

What is claimed is:

1. A trunk of a motorcycle provided with a storage compartment, comprising:

a trunk body member having an upper opening and including an outer body member and an inner body member provided inside the outer body member;

a lid member attached to the trunk body member so as to cover the opening of the trunk body member and provided with a lamp device for illuminating a rear side of the trunk, the lid member including an outer lid member and an inner lid member provided inside the outer lid member, wherein the lamp device is attached to an outer side surface of the outer lid member;

a wire cord of the lamp device passing through a gap between the outer lid member and the inner lid member and a gap between the outer body member and the inner body member; and a guide member provided on an inner surface of the outer lid member and configured to guide the wire cord.

2. The trunk of a motorcycle according to claim 1, wherein the lid member is rotatably connected to the trunk body member through a hinge portion, the wire cord is accommodated in a housing provided in a vicinity of the hinge portion, the wire cord has a slack portion for allowing rotation of the lid member in a vicinity of the hinge portion, and the slack portion is accommodated in the housing wherein a guide portion for slackening the wire cord in a rotating axis direction of the hinge portion is formed in a vicinity of the hinge portion.

3. The trunk of a motorcycle according to claim 1, wherein an attachment surface for the lamp device is formed to the outer lid member, a communication hole communicating the gap between the outer lid member and the inner lid member to an outside of the trunk is formed in the attachment surface, and the lamp device is attached so as to block the communication hole.

4. The trunk of a motorcycle according to claim 1, wherein the inner lid member has an edge overlapped with an edge portion of the inner body member from an outside in a closed state of the lid member.

* * * * *